United States Patent

Peters et al.

[15] 3,669,863

[45] June 13, 1972

[54] TECHNIQUE FOR THE PREPARATION OF IRON OXIDE FILMS BY CATHODIC SPUTTERING

[72] Inventors: Frank Groom Peters, Nutley; William Robert Sinclair, Miles; Vincent Sullivan, Summit, all of N.J.

[73] Assignee: Bell Telephone Laboratories, Incorporated, Murray Hill, N.J.

[22] Filed: Dec. 28, 1970

[21] Appl. No.: 101,478

[52] U.S. Cl. ....................204/192

[51] Int. Cl. ....................C23c 15/00

[58] Field of Search ....................204/192

[56] References Cited

UNITED STATES PATENTS

| | | | |
|---|---|---|---|
| 3,461,054 | 8/1969 | Uranty | 204/192 |
| 3,485,666 | 12/1969 | Sterling et al. | 204/192 |

OTHER PUBLICATIONS

Holland " Vacuum Deposition of Thin Films," 1965, pages 474–482.

*Primary Examiner*—John H. Mack
*Assistant Examiner*—Sidney S. Kanter
*Attorney*—R. J. Guenther and Edwin B. Cave

[57] ABSTRACT

A technique for the preparation of iron oxide films designed for use as photomasks for thin film and semiconductor processing involves sputtering iron in a carbon monoxide ambient containing carbon dioxide upon a substrate member.

6 Claims, 1 Drawing Figure

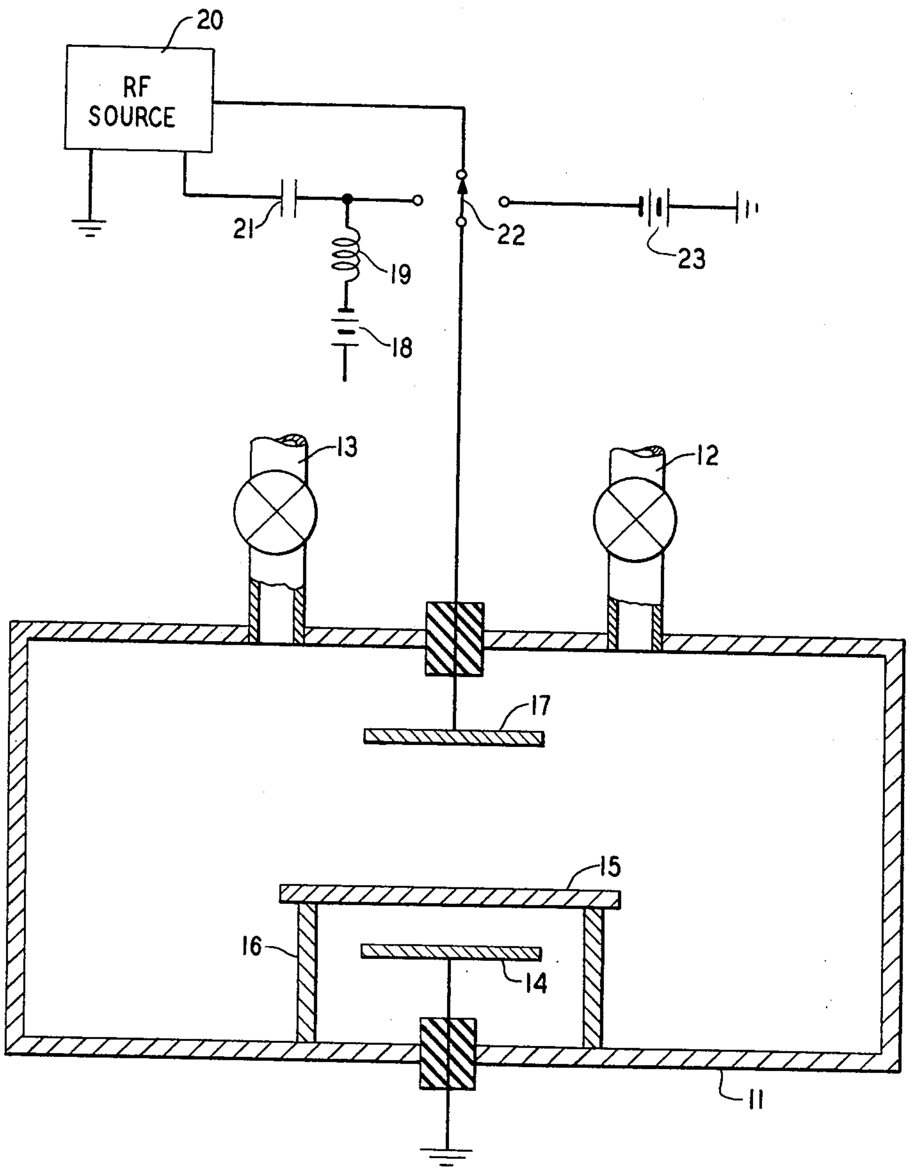
INVENTORS F. G. PETERS
W. R. SINCLAIR
M.V. SULLIVAN
BY Edward M. Fink
ATTORNEY

TECHNIQUE FOR THE PREPARATION OF IRON OXIDE FILMS BY CATHODIC SPUTTERING

BACKGROUND OF THE INVENTION

1. Field of the Invention

This invention relates to a technique for the preparation of iron oxide films. More particularly, the present invention relates to a technique for the fabrication of iron oxide films designed for use as photomasks in photoresist and photolithographic processes, such films being obtained by cathodic sputtering techniques.

2. Description of the Prior Art

The need for processing localized areas in microcircuit technology has generated a technology directed to the efficacious preparation and utilization of masks to define diffusion, evaporation and related operations. The use of well-known photomask processes for attaining this end has been universally applied in the microcircuit processing industry with varying degrees of success. Typically, such techniques involve the preparation of a suitable photomask defining the pattern of interest and the use of this mask to transfer an image to a photoresist pattern.

Until recently, it had been conventional to form the mask pattern in a photographic emulsion. In numerous applications, the masks so formed are used repetitively and due to the inherent softness of photographic emulsions deteriorate rapidly due to abrasion. Accordingly, workers in the art turned their attention toward the development of masks manifesting greater durability.

This end was attained by the use of hard inorganic opaque materials, typically metal on glass. A popular mask falling within the scope of this class is prepared by evaporating chromium upon a glass substrate and thereafter forming the desired pattern in photoresist on this surface. Thereafter, the pattern is etched into the chromium. These masks have been found to be very durable and manifest a potentially higher resolution capability than photographic emulsion masks, such being attributed both to the thinness of the deposited metal and the lack of grain and thinness in the image defining photoresist. Although satisfactory from many standpoints, such photomasks are opaque and reflect a high percentage of incident radiation including the light normally used during alignment of the photomask with respect to patterns previously imposed on the substrate. Both the opacity and reflectivity contribute to the difficulty of carrying out this alignment, especially on equally reflective metallized substrates. These masks also reflect the light normally used to expose the photoresist after alignment, so creating a problem of fringing with the concomitant loss of resolution at the edges of the pattern due to multiple reflections between the substrate and the photomask.

Recently, these limitations were successfully overcome by reactively sputtering a hard inorganic compound upon a glass substrate and etching the deposited layer to form the desired pattern. A number of transition metal oxides were found satisfactory for this purpose, that is, transparent to the light used by the operator to align the photomask with the substrate and highly absorbing at the wavelength used to expose the photoresist on the substrate to be processed. Unfortunately, these masks have not proven to be completely acceptable from the standpoint of etching rate.

A more recent development was the discovery of a technique for the fabrication of iron oxide photomasks wherein an iron compound, typically iron pentacarbonyl, is deposited by chemical vapor deposition techniques in a predominately inert or oxidizing ambient. This technique has proven satisfactory but due to the toxicity of the iron pentacarbonyl and the inability to effect in situ cleaning, workers in the art have been prompted to seek suitable alternates.

More lately, a technique was described for the fabrication of an iron oxide photomask which was not subject to such prior art limitations. The technique involved depositing iron oxide films either by RF or combined RF-DC sputtering of iron oxide in a carbon dioxide ambient and etching the resultant deposited film to form a desired pattern. Although satisfactory for most purposes, the search has nonetheless continued for a photomask manifesting superior definition.

SUMMARY OF THE INVENTION

In accordance with the present invention, a technique is described for the fabrication of an improved iron oxide photomask at enhanced deposition rates which manifests superior dissolution characteristics, thereby assuring better definition. The inventive technique involves a novel processing sequence wherein iron oxide films are deposited by RF or DC or combined RF-DC cathodic sputtering of iron in a carbon monoxide ambient containing carbon dioxide. Subsequent to deposition of the iron oxide films etching is effected to yield the desired pattern.

BRIEF DESCRIPTION OF THE DRAWING

The invention will be more readily understood by reference to the following detailed description taken in conjunction with the accompanying drawing wherein:

The FIGURE is a schematic representation of an apparatus used in the practice of the present invention.

DETAILED DESCRIPTION

With further reference now more particularly to the FIGURE, there is shown a vacuum chamber 11 provided with an outlet 12 for connection to a vacuum pump (not shown), an inlet 13 for the introduction of a sputtering gas which comprises a mixture of carbon monoxide and carbon dioxide, an anode member 14, a substrate holder 15 supported by pedestal 16 and a cathode member 17. Cathode member 17 may be connected to the negative pole of a direct current high potential supply 18 by means of inductor 19 and to an RF supply 20 by means of capacitor 21 (the inductor and capacitor being of such value as to pass and reject RF and direct current components as needed) or, in the alternative, directly to RF source 20 by means of switch 22 or to direct current high potential supply 23. The positive pole of the direct current supplies 18 and 23 and one end of RF supply 20 are connected to ground.

The present invention may conveniently be described by reference to an illustrative example wherein it is desired to cathodically sputter an iron oxide coating upon a suitable substrate member in an apparatus of the type shown in the FIGURE.

In the operation of the process a suitable substrate which may be ordinary glass or any material which is transparent over the range of 3,000 to 6,000 A is inserted within chamber 11 upon substrate holder 15. Extensive studies of substrate surfaces have resulted in the conclusion that superior definition may be attained by sputter-etching the substrate surface prior to deposition thereon of the iron oxide film, such technique resulting in removal of material from the substrate and smaller deposited particle size. Accordingly, the preliminary substrate treatment is considered necessary for the purposes of the present invention.

Additionally, it has been found advantageous to cool the substrate member during the sputtering process in order to obtain the desired soluble films. The iron selected for use in the practice of the present invention may be selected from among any iron source commercially available such as cold rolled steel, ferrous oxide ($Fe_3O_4$), ferric oxide ($Fe_2O_3$), etcetera. The term "iron" as employed herein is defined as encompassing the iron oxides as well as essentially pure iron.

The vacuum techniques utilized in the practice of the present invention are known (see "Vacuum Deposition of Thin Films," L. Holland, J. Wiley and Sons, Inc., New York, 1956). In accordance with such procedures, the vacuum chamber is first evacuated, flushed with an inert gas as, for example, any of the members of the rare gas family such as helium, argon or neon and the chamber reevacuated. The extent of the vacuum required is dependent upon consideration of several factors which are well known to those skilled in the art. However, for the purposes of the present invention a practical initial pressure range is from $10^{-5}$ to $10^{-7}$ torr., while suitable sputtering gas pressures, that is, carbon monoxide and carbon dioxide mixtures range from $1 \times 10^{-3}$ to $1 \times 10^{-1}$ torr. It has been determined that the sputtering gas may comprise from 82 to 50 percent by volume carbon monoxide, remainder carbon dioxide when the cathode member is cold rolled steel and from 87 to 50 percent by volume carbon monoxide, remainder carbon dioxide when the cathode member comprises oxygen. The upper limit of 82 and 87 percent carbon monoxide, respectively, is dictated by the fact that the use of greater amounts result in the formation of a black film which is unsuitable for use as a photomask. The lower limits of 50 percent by volume carbon monoxide are dictated by practical considerations. After the requisite pressure is attained, cathode 17, which may be comprised of either cold rolled steel, ferric or ferrous oxide is connected to a source of RF potential directly or is connected to the negative pole of a source of direct current having an RF potential impressed thereon and sputtering initiated by making anode 15 positive with respect to the cathode. In the case of a steel cathode, connection may be made solely to the negative pole of a direct current source.

The minimum voltage necessary to produce sputtering is dependent upon the specific cathode material employed. For example, a potential of approximately 1,500 volts may be employed to produce a layer of iron oxide suitable for the purposes of this invention. However, in certain instances, it may be desirable to sputter at voltages greater than or less than the noted voltage.

With regard to the RF excitation, it has been found that in order to produce the desired effect the frequency employed must be at least 0.1 megacycle and may range up to the plasma frequency which is defined by the following equation:

$$\omega_p = (ne^2/\epsilon_o m)^{1/2}$$

wherein n = electron density e = electron charge $\epsilon_o$ = dielectric constant of material sputtering, and m = effective electron mass.

The use of frequencies less than 0.1 megacycle fail to significantly enhance the operation of the process since the plasma density is not appreciably increased whereas the plasma frequency, as defined above, constitutes the absolute maximum beyond which the system shuts down. The potential of the RF source may range from 1 volt to 10 kilovolts, the limits being dictated by practical considerations.

The spacing between the anode and cathode is not critical. However, the minimum separation is that required to produce a glow discharge. For the best efficiency during the sputtering process, the substrate should be positioned immediately without the well-known Crooke's dark space.

The balancing of the various factors of voltage, pressure and relative positions of the cathode and anode to obtain a high quality deposit is well known in the sputtering art.

With reference now more particularly to the example under discussion, by employing a proper voltage pressure and spacing of the various elements within the vacuum chamber, a layer of iron oxide is deposited upon the electrically isolated glass substrate material to yield a film suitable for use as a photomask. Thereafter the iron oxide film may be coated with a commercially available photoresist, exposed to a light pattern and developed by conventional commercial techniques. Finally, an etchant is employed for the purpose of obtaining the desired pattern in the film.

Examples of the present invention are described in detail below. The examples are included merely to aid in the understanding of the invention and variations may be made by one skilled in the art without departing from the spirit and scope of the invention.

EXAMPLE I

A cathodic sputtering apparatus similar to that shown in the FIGURE was used to produce an iron oxide layer. In the apparatus employed, the substrate comprising a 2- by 2-inch soda-lime glass microscope slide was situated upon the substrate holder and a cold rolled steel cathode employed. Initially, an RF potential manifesting a net power of 350 watts at a frequency of 13.56 MHz was applied to the system and the vacuum chamber initially evacuated to a pressure of $1 \times 10^{-5}$ torr. by a turbomolecular pump. Next, the chamber was flushed with carbon monoxide and reevacuated to a partial pressure of 28 microtorr. of a carbon dioxide-carbon monoxide mixture (80 percent by volume carbon monoxide-20 percent by volume carbon dioxide). Sputter etching of approximately 600 A of the glass substrate was affected prior to deposition of iron oxide.

The cathode was a 6-inch disc of cold rolled steel mounted on a water-cooled stainless steel block. Sputtering was conducted for 20 minutes, so resulting in an iron oxide film 2,200 A in thickness, the deposition rate being approximately 110 A per minute. The resultant iron oxide film was examined and found to manifest a good spectrum and was found to be completely soluble in less than two minutes in six molar hydrochloric acid at 25° C with no evidence of strain, so indicating its suitability for use in the fabrication of photomasks. Utilizing the scanning electron microscope, it was observed that there was a complete absence of large particles in the film, such being attributed to the sputter etching treatment.

EXAMPLE II

The procedure of Example I was repeated with the exception that the sputtering gas comprised 50 percent by volume carbon monoxide-50 percent by volume carbon dioxide at an RF potential manifesting a net power of 270 watts. Sputtering was conducted for 50 minutes, so resulting in an iron oxide film 2,600 A in thickness, the deposition rate being approximately 52 A per minute. The resultant iron oxide film was examined and found to manifest a good spectrum and was found to be completely soluble in less than 2 minutes in six molar hydrochloric acid at 25° C with no evidence of strain, so indicating its suitability for use in the fabrication of photomasks. Utilizing the scanning electron microscope, it was observed that there was a complete absence of large particles in the film, such being attributed to the sputter etching treatment.

EXAMPLE III

The procedure of Example I was repeated with the exception that a DC power supply was substituted for the RF supply. Sputtering was conducted at a 3.5 kilovolt cathode potential, a current of 62 milliamperes and a gas pressure of 60 microtorr. Sputtering was conducted for 30 minutes, so resulting in an iron oxide film 1,650 A in thickness, the deposition rate being approximately 55 A per minute. The resultant iron oxide film was examined and found to manifest a good spectrum and was found to be completely soluble in less than 2 minutes in six molar hydrochloric acid at 25° C with no evidence of strain, so indicating its suitability for use in the fabrication of photomasks. Utilizing the scanning electron microscope, it was observed that there was a complete absence of large particles in the film, such being attributed to the sputter etching treatment.

EXAMPLE IV

The procedure of Example I was repeated utilizing a 6-inch disc of solid $Fe_2O_3$ as the cathode. Sputtering was conducted for 20 minutes, so resulting in an iron oxide film 1,900 A in thickness, the deposition rate being approximately 95 A per minute. The resultant iron oxide film was examined and found to manifest a good spectrum and was found to be completely soluble in less than two minutes in six molar hydrochloric acid at 25° C with no evidence of strain, so indicating its suitability for use in the fabrication of photomasks. Utilizing the scanning electron microscope, it was observed that there was a complete absence of large particles in the film, such being attributed to the sputter etching treatment.

We claim:

1. A method for the fabrication of a photomask comprising the steps of (a) sputter-etching a substrate member, (b) depositing a layer of iron oxide upon said substrate member by cathodic sputtering of an iron cathode in a carbon monoxide ambient containing carbon dioxide, said ambient comprising from 87 to 50 percent by volume carbon monoxide, and (c) etching said layer to form a desired pattern.

2. A method in accordance with the procedure of claim 1 wherein said cathode comprises cold rolled steel.

3. A method in accordance with the procedure of claim 1 wherein said cathode comprises iron oxide.

4. A method in accordance with the procedure of claim 2 wherein said cathode member is biased with RF excitation.

5. A method in accordance with the procedure of claim 2 wherein said carbon monoxide ambient comprises from 82 to 50 percent by volume carbon monoxide, remainder carbon dioxide.

6. Photomask having defined areas of iron oxide produced by cathodic sputtering of an iron cathode in a carbon monoxide ambient containing carbon dioxide, said ambient comprising from 87 to 50 percent by volume carbon monoxide.

* * * * *